J. J. FLYNN.
THREADING TOOL.
APPLICATION FILED OCT. 24, 1919.
1,350,861.
Patented Aug. 24, 1920.
2 SHEETS—SHEET 1.
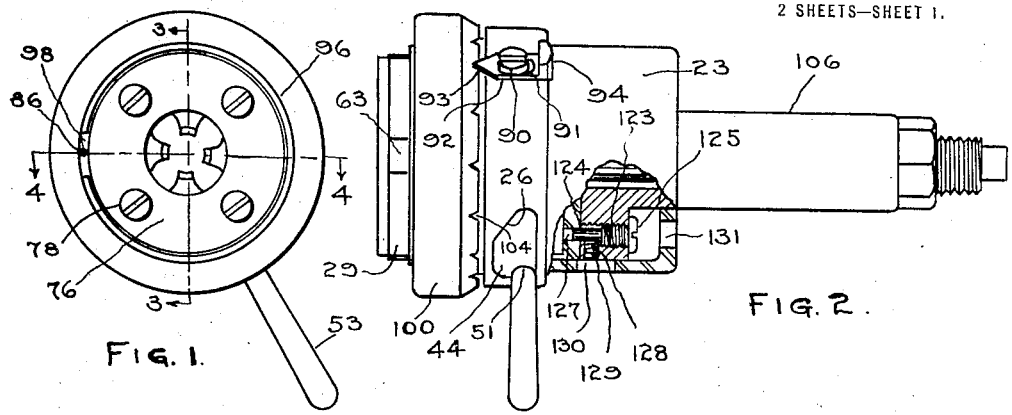
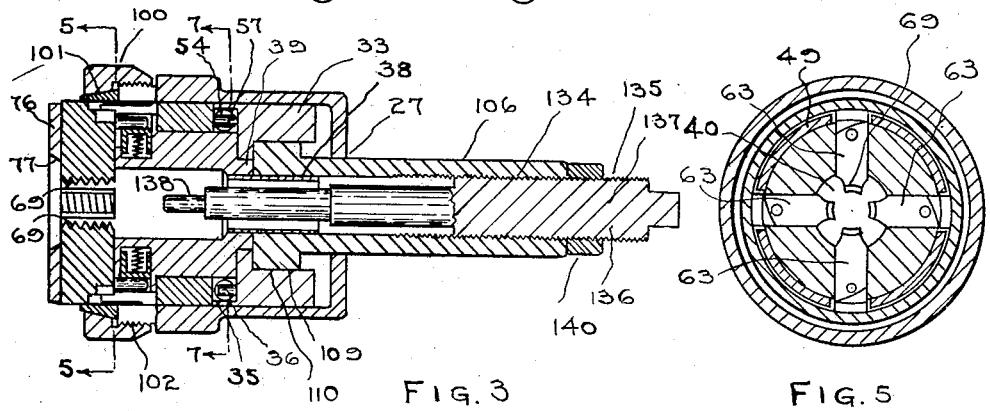
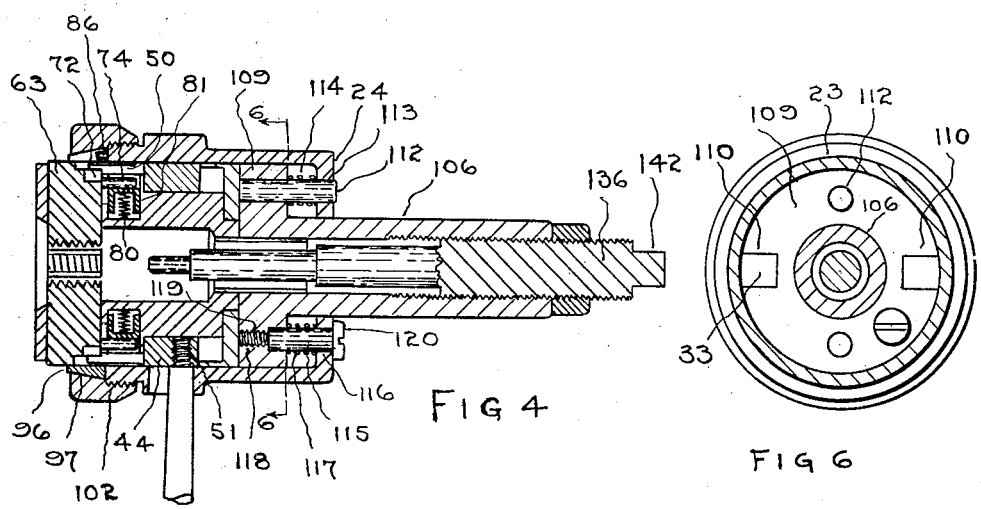
INVENTOR
John J. Flynn
By Horatio E. Bellows
ATTORNEY J. J. FLYNN.
THREADING TOOL.
APPLICATION FILED OCT. 24, 1919.
1,350,861.
Patented Aug. 24, 1920.
2 SHEETS—SHEET 2.
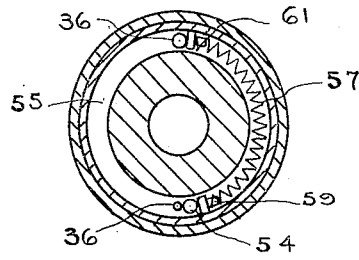
FIG. 7
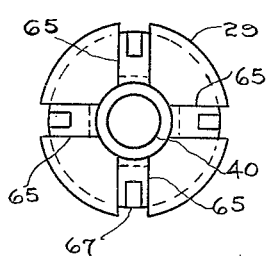
FIG. 8
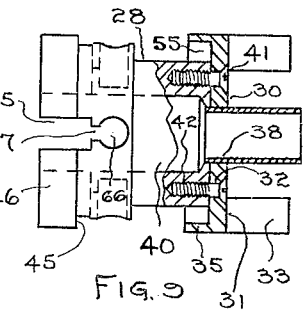
FIG. 9
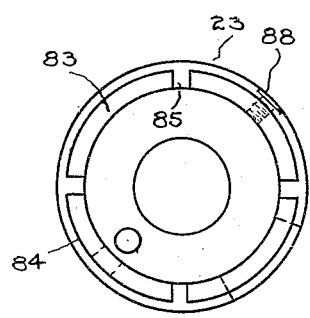
FIG. 11
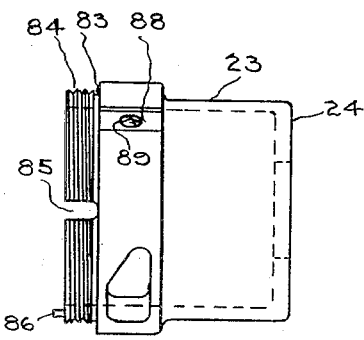
FIG. 12
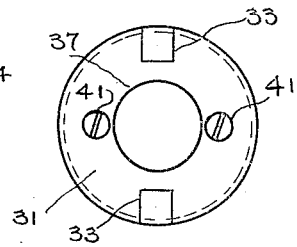
FIG. 10
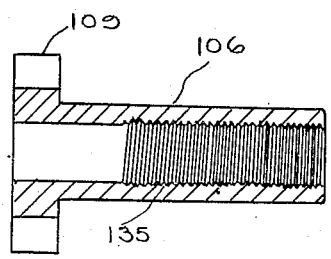
FIG. 13
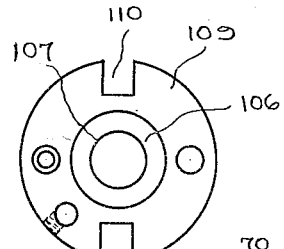
FIG. 14
FIG. 17.   FIG. 18
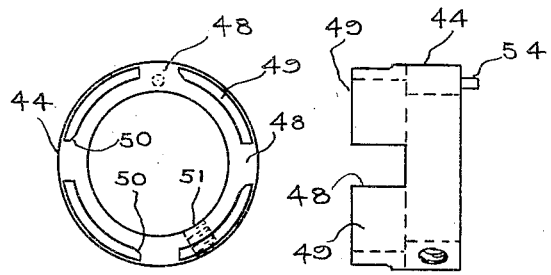
FIG. 15   FIG. 16
INVENTOR
John J. Flynn
By Horatio E. Bellows,
ATTORNEY

UNITED STATES PATENT OFFICE.

JOHN J. FLYNN, OF PROVIDENCE, RHODE ISLAND.

THREADING-TOOL.

1,350,861.  Specification of Letters Patent.  Patented Aug. 24, 1920.

Application filed October 24, 1919.  Serial No. 332,872.

*To all whom it may concern:*

Be it known that I, JOHN J. FLYNN, a citizen of the United States, residing at Providence, in the county of Providence and State of Rhode Island, have invented certain new and useful Improvements in Threading-Tools, of which the following is a specification.

My invention relates to threading tools of the opening type adapted for use upon turrets and screw machine supports, and is an improvement of the structure set forth in my prior United States Patent No. 1,259,504 issued March 19, 1918.

The essential objects of my invention are to effectively regulate the travel and action of the operative parts of the device relatively to the work, whereby a more accurate and uniform thread is produced thereon; to insure an immediate release of the work by the cutting elements when the predetermined exact length of thread has been cut; and to simplify the construction and facilitate the operation of the device.

My invention consists, therefore, in the means and mechanism for producing the results specified, substantially as hereinafter described and claimed, and as shown in the accompanying drawings which form a part of this specification, and in which Figures 1 and 2 are end and side elevations respectively of a threading tool embodying my invention, a portion of Fig. 2 being in broken section, Figs. 3 and 4, sections of the same on lines 3—3 and 4—4 respectively of Fig. 1, Figs. 5 and 6, sections on lines 5—5 of Fig. 3 and 6—6 of Fig. 4 respectively, Fig. 7, a section on line 7—7 of Fig. 3, Fig. 8, an outer end elevation of the chaser carrier, Fig. 9, a side elevation partly in central longitudinal section of the same, Fig. 10, a rear end elevation of the same, Figs. 11 and 12, an end and side elevation of the casing, Fig. 13 a longitudinal central section of the shank, Fig. 14 a rear elevation of the same, Figs. 15 and 16, end and plan elevation respectively of the cam actuating member, and Figs. 17 and 18 details of the chasers.

Like characters of reference indicate like parts throughout the views.

In the form thereof herein shown my threading tool comprises a shell or casing having a cylindrical side wall 23 and a rear end wall 24, provided respectively with a cam slot 26 and opening 27.

Longitudinally slidable in the shell is a hollow body or chaser carrier 28 comprising in this instance a carrier section 29 and guide section 30. The latter, as shown in Figs. 9 and 10, comprises a disk 31 provided with perforations 32, and having guide lugs 33 diametrically opposite each other on its rear face. There is a lateral peripheral flange 35 upon its opposite face, together with two diametrically opposite pins 36. In a central opening 37 in the plate is a guide flange or sleeve 38 fast to or integral with section 29 in a retracted portion 39 of a longitudinal bore 40 extending throughout the member 29. The disk 31 is further engaged by screws 41 located in threaded openings 42, in section 29 and in perforations 32. The section 30 is, for purposes of construction, made as a separate piece from the section 29, but so closely associated therewith that the two are practically integral.

Rotatably mounted on the member 29 is a chaser closer comprising a sleeve 44 with its ends bearing against the flange 35, and shoulder 45 formed by an enlargement 46 of the member 29. In detail, as shown in Figs. 15 and 16, there are four equi spaced marginal slots 48 forming spaced shoulders 49 having internal cam faces 50 upon one end of each. The sleeve has a lateral threaded opening 51 to receive the threaded end of a handle or arm 53 extending through the cam slot 26 of the shell. On the rear of the sleeve 44 is a pin 54 projecting into the channel 55 formed by the flange 35. A compression helical spring 57 in the channel has one bearing end 59 resting against the pin 54 and its opposite end 61 against a pin 36. The sleeve is manually moved in one direction by handle 53, and is returned by the spring 57, and is purposed to close the chasers 63.

The chasers, in this instance four in number, are slidably mounted in rectangular radial guideways 65 in the body extending from the bore 40 to the body periphery. In alinement with these, are cylindrical cavities 66 communicating with the guideways through retracted spaces 67. As shown in Figs. 17 and 18 each chaser has on its inner end a series of cutting teeth 69, and upon its outer end an upper curved flange or shoulder 70, an intermediate shoulder 71, and a bottom shoulder or cam surface 72 eccentric to the other shoulders or surfaces. In the back of each chaser is a pin 74. As illustrated a face plate 76 provided with a central opening 77 is fixed by screws 78 to the body. The chasers are outwardly pressed by helical springs 80 in the cavities 66 carrying on their outer ends caps 81 pressing against the pins 74 which pass through the spaces 67 into the cavities. The cam faces 72 are thus pressed into the paths of the cam faces 50 of the members 49, and the rotary movement of the sleeve 44 by the handle 53 contracts the chasers.

The end of the shell wall 23 has a reduced portion 83 provided with an external thread 84 and four slots 85, and upon its end face a pin 86. Adjacent the portion 83 the shell has a guideway 88 in which is a threaded perforation 89 which receives a screw 90 passing loosely through a longitudinal slot 91 in a slide 92 which has a point 93 upon its front end, and a finger piece 94 upon its opposite end. A split ring 96 has a conical exterior slide face 97 and its base abuts against the end of the portion 83 of the shell. The space 98 between the ends of the split ring amply admits the pin 86. The ring embraces the outer shoulders of the chasers, and when the former is contracted by compression it causes the cutting portions 69 of the chasers to approach each other. This contraction is effected by a collar 100 provided with a conical opening 101 embracing the surface 97 of the split ring. The collar has also an internal thread 102 engaging the thread 84. The manual rotation of the collar is a means of contracting the chasers auxiliary to that of the sleeve 44, and is micrometric in degree. The collar is held in any desired or predetermined axial position of adjustment by equi spaced V shaped cavities 104 in its rear edge, adapted to receive the point 93 of the slide 92. The distances between the cavities are uniform, and may be indexed and numbered.

The shell is slidably mounted upon a tubular shank 106 passing through the opening 27 and having fast to its end in a central opening 107 a cylindrical head 109 slidable in the shell, and slidable on the members 33 which extend through longitudinally disposed peripheral channels 110 diametrically opposite each other in the head. Fast in the head is a guide pin 112 slidable in an opening 113 in the wall 24 of the shell. A spring 114 surrounding the pin has its ends pressing against the wall and head. A second guide pin 115 slidable in an opening 116 in the wall is surrounded by a spring 117 and has a threaded end portion 118 adapted to engage a threaded cavity 119. A screw head 120 on the pin exterior of the wall 24 serves as a stop for the outward travel of the head 109. For limiting the travel of the head in an opposite direction is an adjusting screw comprising a threaded body 123, a plain shank 124, and a head 125. As shown in Fig. 2 the body engages a threaded longitudinal hole through the head, and the shank extends into a cavity 127 in the disk 31. By turning this screw the head 125 approaches or recedes from the wall 23. In a threaded opening 128 in the head is a set screw 129, engaging the screw shank. Openings 130 and 131 in the shell walls 23 and 24 respectively, opposite the screw heads, afford accessibility thereto.

The shank 106 has an internal thread 134 engaging an external thread 135 upon the inner end portion 136 of a spindle 137. The remainder of the spindle is of reduced diameter as at 138 and unthreaded. The outer extremity of the spindle is movable into a position concentric with the cutting portions of the chasers 63 or to a position at the rear thereof by turning the spindle. A lock nut 140 on the spindle coöperates with the shank 106 to maintain the spindle in adjusted position. Such position is determined by the length of thread desired on the work. In this instance the spindle has a reduced squared projection 142 upon its inner end.

The operation of my device is as follows. The chasers are adjusted by means of the collar to cut the correct pitch diameter. If the turret intended to carry my device is operated by a cam, the spindle 137 is employed. The spindle is adjusted by turning the projection 142 to bring the outer end of the spindle to such a position as to just touch the end of the work after the thread shall have been cut, in order to insure a positive opening of the chaser. If the turret is not operated by a cam, as is the case with hand operated and semiautomatic machines which are provided with stops to control the forward movement of the carriage slide, the spindle is entirely withdrawn from the shank 106. The shank is next made fast in the turret and the latter advances the shank, its head 109, the chaser carrier, and the shell at the same rate of travel until the chaser teeth 69 engage the already rotating work. The latter, by its rotation, gradually draws the carrier and shell away from the head 109 which is still advancing but at a less rate of travel. The parts thus advance until the spindle 137 strikes the front end of the work which stops the forward travel of the turret, the spindle, the shank, and the shell, but permits the carrier to continue its travel until the flanges 70 of the chasers advance beyond the split ring whereupon the chasers expand and release the work.

When the spindle 137 is absent from the tool the operation is as described except the stop on the turret performs the function otherwise performed by the spindle.

I claim:—

1. In a threading tool, a shell provided with an opening, a head slidably mounted in the shell, a shank on the head extending through the opening, a chaser carrier slidably mounted in the shell and movable independently of the head, and chasers yieldingly mounted in the carrier.

2. In a threading tool, a shell provided with an opening, a head slidably mounted in the shell, a shank on the head extending through the opening, a chaser carrier slidably engaging the head mounted in the shell, and chasers yieldingly mounted in the carrier.

3. In a threading tool, a shell provided with an opening, a head slidably mounted in the shell provided with guideways, a shank on the head extending through the opening, a chaser carrier comprising a body slidably mounted in the shell, and lugs slidable in the guideways, and chasers mounted in the body.

4. In a threading tool, a shell provided with an opening, a hollow head slidably mounted in the shell, a tubular shank on the head extending through the opening and provided with a screw thread, a hollow chaser carrier slidably mounted in the shell and movable independently of the head, chasers yieldingly mounted in the carrier, and a spindle in the shank provided with a thread loosely engaging the first thread and extending adjacent the chasers.

5. In a threading tool, a shell provided with an opening, a hollow head in the shell, a tubular shank on the head extending through the opening and provided with a thread, a hollow chaser carrier in the shell, chasers in the carrier adapted to engage work, a stop spindle in the shank adopted to engage work in the chasers and provided with a thread engaging the first thread, and a lock nut on the spindle exterior of the shank.

6. In a threading tool, a shell provided with an opening, a head yieldingly mounted in the shell, a guide pin in the head engaging the shell, a stop pin adjustably mounted in the head engageable with the shell, a shank on the head extending through the opening, a chaser carrier slidably mounted in the head, and chasers mounted in the carrier.

7. In a threading tool, a shell provided with an opening, a head yieldingly mounted in the shell, a stop pin adjustably mounted in the head slidably engaging the shell, a shank on the head extending through the opening, a chaser carrier mounted in the head, and chasers mounted in the carrier.

8. In a threading tool, a shell provided with a large opening and with small openings, a head slidably mounted in the shell, pins in the head slidable in the small openings, a stop head on one of the pins exterior of the shell, springs on both pins within the shell, a shank on the first mentioned head extending through said large opening, a chaser carrier mounted in the head, and chasers in the carrier.

In testimony whereof I have affixed my signature.

JOHN J. FLYNN.